United States Patent [19]
Breglia et al.

[11] 3,748,751
[45] July 31, 1973

[54] LASER MACHINE GUN SIMULATOR

[75] Inventors: Denis R. Breglia, Altamonte Springs;
Alfred H. Rodemann, Maitland;
Windell N. Mohon, Winter Park, all of Fla.

[73] Assignee: The United States of America as represented by the Secretary of the Navy, Washington, D.C.

[22] Filed: Sept. 7, 1972

[21] Appl. No.: 287,120

[52] U.S. Cl. .................................. 35/25, 273/101
[51] Int. Cl. .................................................. F41g 3/26
[58] Field of Search .................. 35/25, 1; 273/101.1, 273/105.1; 356/4, 5

[56] References Cited
UNITED STATES PATENTS

| | | | |
|---|---|---|---|
| 3,243,896 | 4/1966 | Immarco et al. | 35/25 |
| 3,422,548 | 1/1969 | Waldhauer, Jr. | 35/25 |
| 3,452,453 | 7/1969 | Ohlund | 35/25 |
| 3,447,033 | 5/1969 | Redmond et al. | 35/25 X |
| 3,633,285 | 1/1972 | Sensney | 35/25 |
| 3,647,298 | 3/1972 | Soules | 356/5 |
| 3,657,826 | 4/1972 | Marshall et al. | 35/25 |

*Primary Examiner*—Robert W. Michell
*Assistant Examiner*—J. H. Wolff
*Attorney*—Richard S. Sciascia and John W. Pease

[57] ABSTRACT

A laser, automatic fire weapon (machine gun) trainer, comprising a laser, automatic fire weapon simulator including a high intensity visible laser light source, a rotating disc shutter means for producing from the light source a beam cyclically modulated to simulate the normal rate of fire of the weapon and a switch controlled ray interrupting second shutter means actuated from the weapon trigger to manually control the bursts of simulated fire, together with target display means for receiving the bursts of modulated light beams to visually indicate on the target display the accuracy of weapon manipulation and firing.

5 Claims, 3 Drawing Figures

LASER MACHINE GUN SIMULATOR

BACKGROUND OF THE INVENTION

This invention relates to weapon simulators, and more particularly to a laser, automatic weapon firing simulator for training of gunners on automatic burst fire weapon such as a machine gun.

Heretofore, there was no suitable training apparaus which would provide highly realistic simulation of the visual effect of an actual burst of fire directed against a target or targets without the employment of live ammunition and marking or destroying targets. Further, there was no means for visual coordination between instructor and student in teaching the basic objectives of machine gun marksmanship such as obtaining an accurate initial burst, traversing and searching the gun, satisfactorily leading a moving target, and observation and adjustment of fire.

SUMMARY OF THE INVENTION

In the subject invention there is provided an automatic fire weapon simulator a high intensity visible laser light source and novel shutter means for modulation of the laser beam to provide cyclic beam projection simulating actual rate of fire of the weapon simulated and a second shutter means providing for fail safe output of the modulated laser beam responsive to depression of the trigger on a weapon to which the simulator mechanism is attached. Further aspects of the invention include the provision of a moving target display means to provide for training in detection, recognition, tracking and leading, the foregoing being accomplished by sole student firing and dual student and instructor firing. A still further aspect of the invention resides in the additional provision of stationary target means and a camera filtered with a narrow bandpass filter whose spectral transmission is centered at the emitting wavelength of the output modulated laser beam whereby automatic recording of hits and target images is provided.

DESCRIPTION OF THE DRAWINGS

The invention may further be said to reside in certain combinations and arrangements of parts by which the foregoing objects and advantages, as well as others, are obtained, as will be understood from the following detailed description when read in conjunction with the accompanying sheets of drawings forming part of this specification, and in which.

DESCRIPTION OF THE PREFERRED EMBODIMENT

Figure 1:
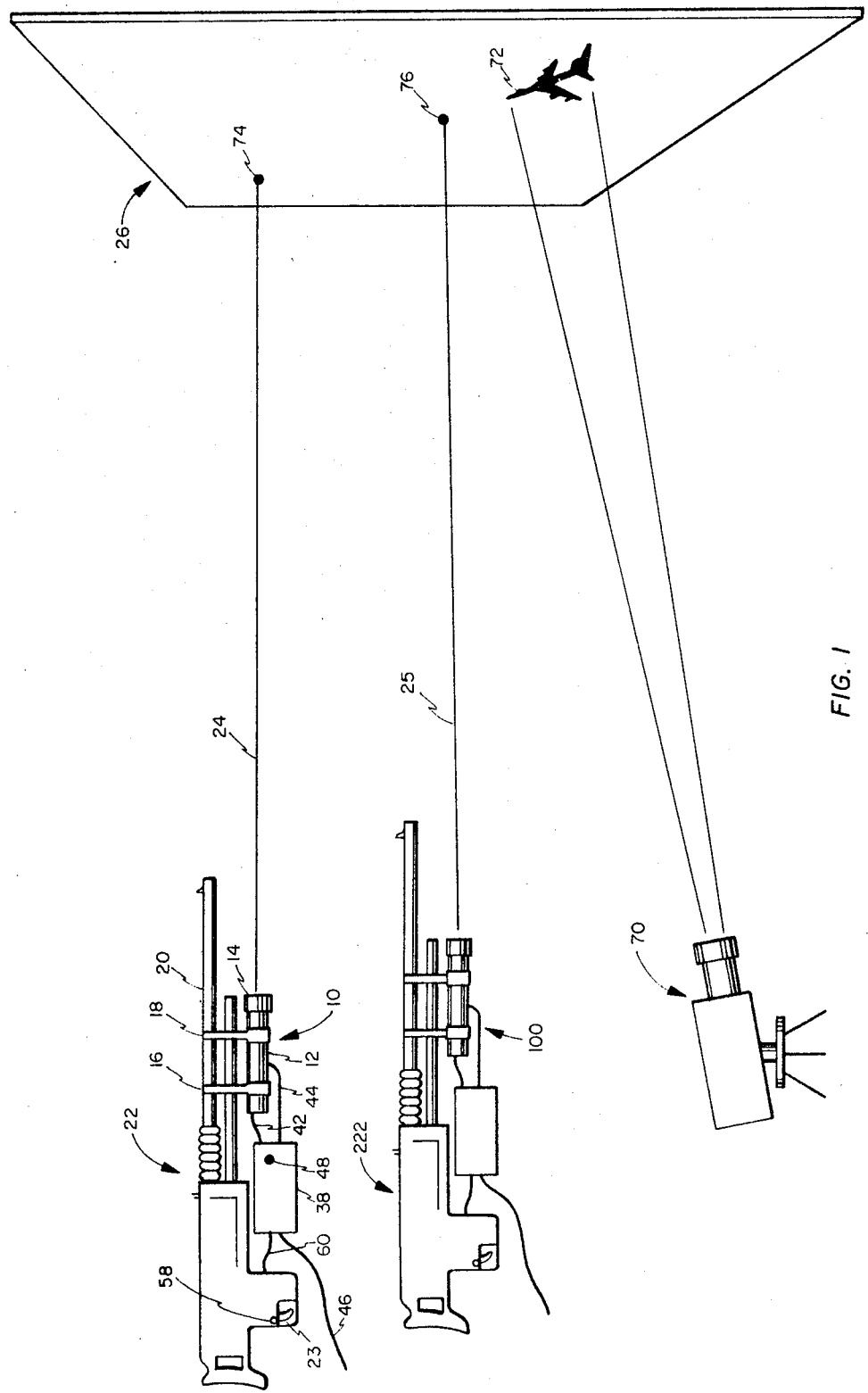
FIG. 1 is a perspective view of training apparatus employing two laser weapon simulators each attached to an automatic fire weapon and directed to an associated target display means, the apparatus embodying the invention.

In the form of the invention illustrated in the drawings and described hereinafter, there is provided in an overall automatic fire weapon trainer, a laser, automatic fire weapon simulator generally indicated at 10 in FIG. 1. The simulator 10 comprises a housing including a laser portion 12 and modulator portion 14 which are integral and attached as by brackets 16 and 18 or other suitable means to the barrel 20 of a machine gun 22 in a position to direct a laser beam 24 in a path parallel to the gun barrel 20 as it is aimed at a target display means indicated generally at 26.

Figure 2:
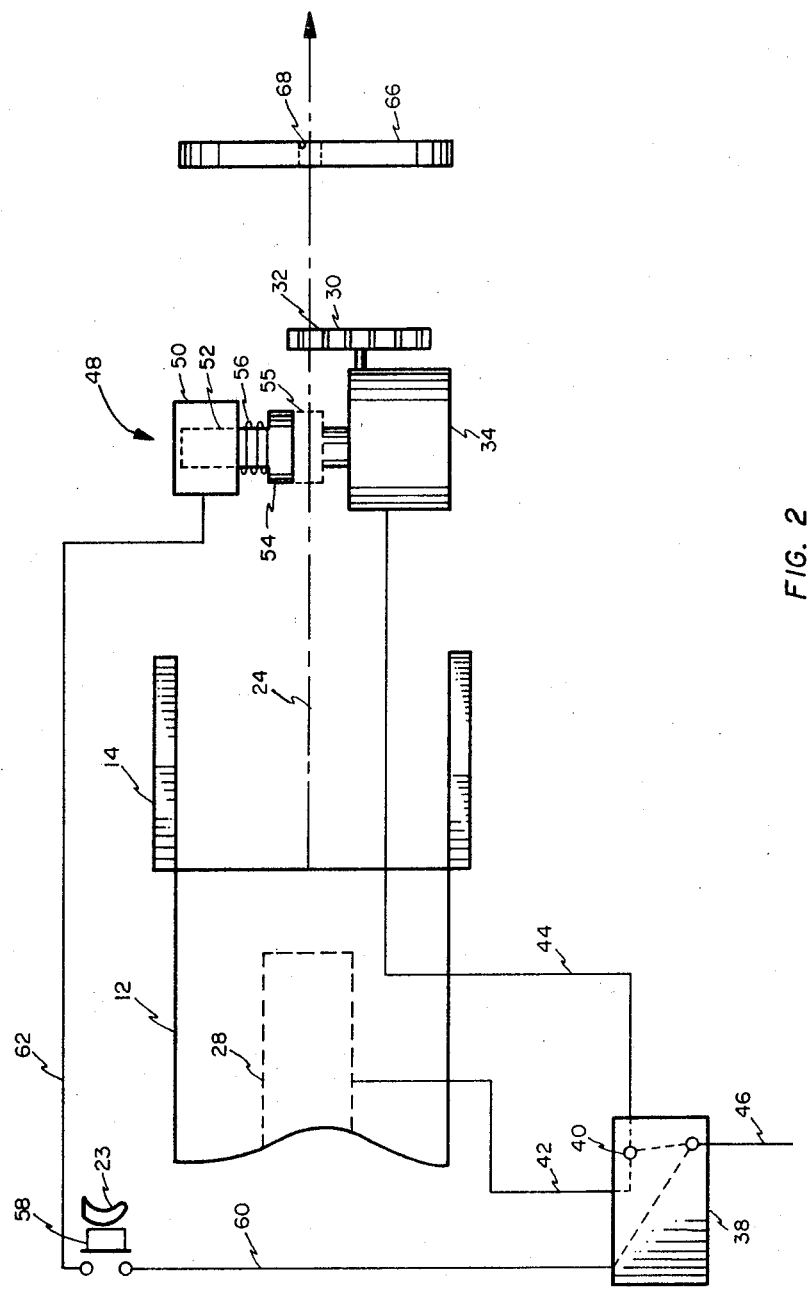
FIG. 2 is an exploded diagrammatic view of details of one of the laser weapon simulators shown as part of FIG. 1.

In FIG. 2 there is shown diagrammatically and in exploded view details of the laser, weapon simulator which incorporates the subject invention. As shown in FIG. 2, a laser light source, which may be a continuous wave helium-neon laser to provide a small, visible high intensity light source, is provided and positioned as shown by dotted outline 28 in the housing portion 12 of the simulator 10. In housing portion 14 there is provided and positioned a motorized, rotatable, slotted disc shutter 30, having slots 32 and suitable drive means such as a motor 34. The output of the laser source 28 is a laser beam 24 indicated by the dash-dot line 24.

The purpose of rotatable disc shutter 30 is to modulate the laser beam to simulate the cyclic rate of fire of the weapon being simulated. One common machine gun would be modulated for about eight pulses per second. As indicated in FIG. 2, the disc is positioned to pass the laser beam 24 each time a slot 32 is aligned with the beam and otherwise to interrupt the beam. The motor 34 is run at a constant speed and the modulation is determined by the width and number of slots 32. Power for the laser 28 and the motor 34 is supplied from a laser power supply box 38 through a common switch 40 via respective lines 42 and 44. Input to the power box is shown by line 46. Thus, when switch 40 is "on," a continuous modulated laser beam output is produced.

To manually control the output of laser beam 24 in coordination with operation of the weapon 22, a second shutter 48 is provided. Shutter 48 is of the solenoid type having an electrical coil 50, armature 52 having a head portion 54 and a biasing spring 56. When the coil 50 is energized the armature 52 is raised against gravity and against the bias of spring 56 to the position shown in FIG. 2, and thereby permits the passage of laser beam 24 through the slots 32 to provide the modulated output laser beam. However, when energy is removed from the coil 50, it moves downwardly under the bias of gravity and spring 56 to position its head portion opposite the slots 32 as shown by the dotted outline 55, to thereby interrupt the output of a laser beam. Energy to coil 50 is provided by suitable means such as a normally open switch 58 connected to the power source box 38 and to the solenoid shutter 48 by respective lines 60 and 62. A trigger 23 is shown in position to actuate the switch 58. The disc shutter 30 and its drive motor 34, together with the second solenoid operated shutter 48, are positioned within the shutter housing portion 14 and the open end is closed by an end plate 66 centrally apertured as at 68 to pass the laser beam 24. The purpose of the apertured end plate 66 is to allow only the output of the direct laser beam 24 and to interrupt any ricochet beam or beams which may bounce off the shutter 54 and internal faces of the housing portion 14.

In operation, the laser source 28 and motorized shutter 30, 32, and 34 are run continuously when switch 40 of power source box 38 is in the "on" condition. The continuous laser beam 24 is blocked by the armature 52 of the solenoid shutter 48 whose head is in the dotted position 55. However, when trigger 23 of weapon 22 is actuated to close switch 58, the solenoid 48 is energized, the armature head moves to its full line position as at 54 and beam 24 is modulated by the rotating slotted disc 30 to produce a modulated output laser beam. The solenoid type shutter 48 provides a fail safe feature in that if power to the solenoid should fail, the spring 56 and/or gravity lowers the armature into the path of the laser beam.

One preferred embodiment of the invention includes, as shown in FIG. 1, a display means for motion pictures, this can be the screen 26 and a motion picture projector 70 for projecting the moving image, in this case a plane 72, on the screen 26. The arrangement as shown in FIG. 1 allows firing at a variety of realistic moving targets and in detection, recognition, and tracking which were not accomplished with prior art methods utilizing stationary targets. Training in leading, tracking and firing at hostile aircraft is easily accomplished with the moving target arrangement. Both the image 72 and the burst of fire 74 are visible to the trainee and instructor. In FIG. 1, there is also shown a second automatic weapon 222 which is an exact duplicate of weapon 22 and which is also provided with simulator apparatus 100 identical to that of simulator 10 described for weapon 22 and producing a modulated laser beam 25. The two weapons are arranged to show how two weapons can be used simultaneously by the trainee and an instructor respectively, to make visually evident to the trainee the difference between his firing effect and more correct effect as demonstrated by the instructor. In the particular display shown in FIG. 1, the burst 74 may represent the instructor's burst, while a burst 76 may represent the simultaneous burst resulting from the trainee firing. The use of different colored lasers such that laser beam 24 is a different color from laser beam 25 is also contemplated, such that each gunner can observe and recognize his own fire.

Figure 3:
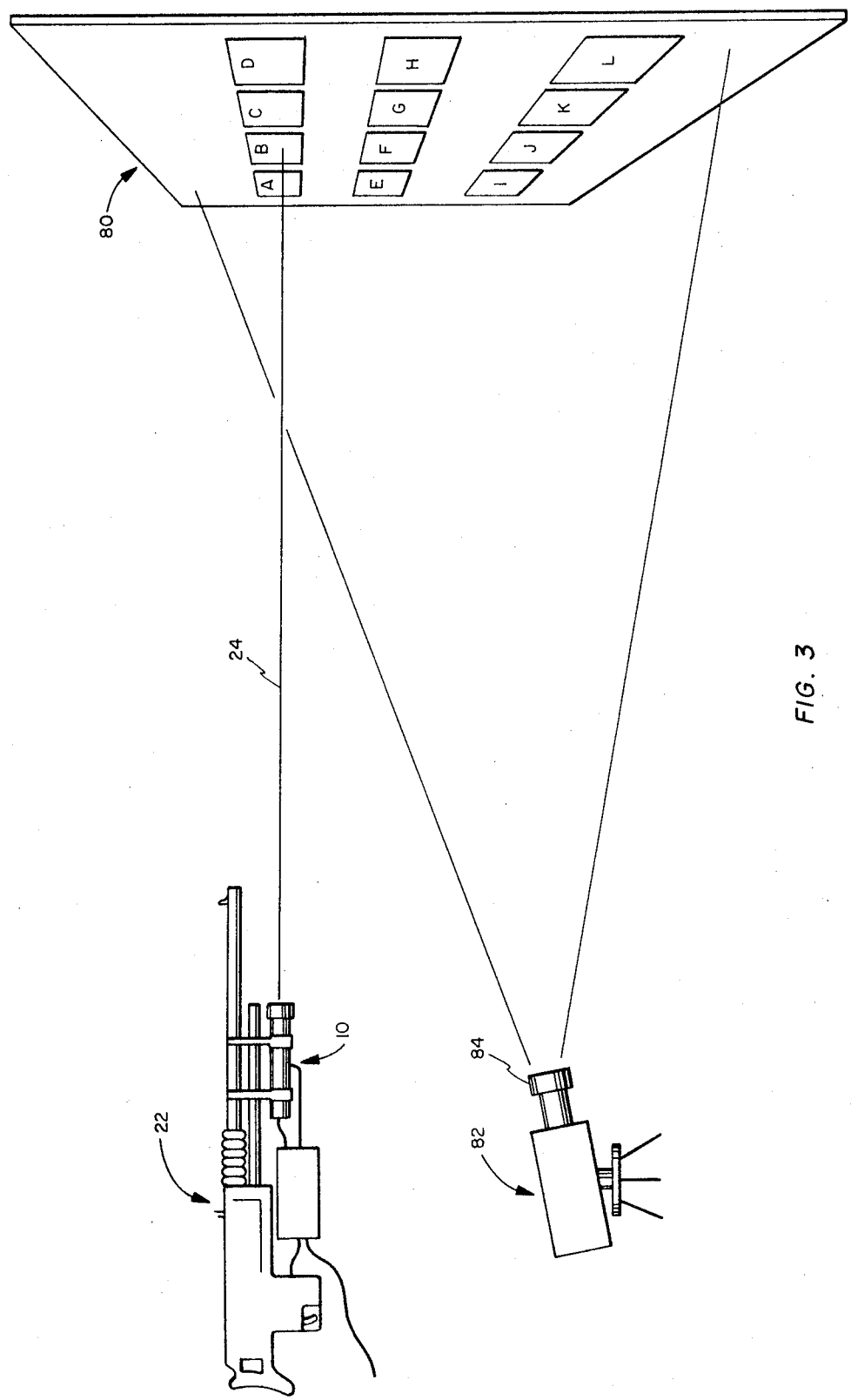
FIG. 3 is a perspective view of a stationary target display and associated camera equipment shown in position of use in relation to a weapon and weapon simulator identical to that shown in FIGS. 1 and 2.

In another aspect of applicant's invention, the automatic weapon 22 and simulator 10, as previously described, are used to direct a modulated laser beam at a display 80 of a plurality of rows of stationary targets A through L, as illustrated in FIG. 3. These targets are usually set at about a ten meter range and hits are recorded by photographic means. In this respect a camera 82 is provided and positioned to view the overall display 80. The camera is provided with a narrow bandpass filter 84 whose spectral transmission is centered at the laser emitting wavelength of laser source 28 (FIG. 2). The filter is chosen based on the ambient light level and the length of the record firing exercise such that the recorded target image and the hits are both visible. By using fast developing film, immediate feedback to the instructor and the trainee is provided and such records may be used for scoring and/or future class discussion.

From the foregoing detailed description, it will be appreciated that the objects and advantages hereinbefore mentioned, as well as others evident from the description, have been attained by the laser, automatic weapon trainer embodying the invention.

Obviously many modifications and variations of the present invention are possible in the light of the above teachings. It is therefore to be understood that within the scope of the appended claims the invention may be practiced otherwise than as specifically described.

What is claimed is:
1. An improved, automatic fire weapon trainer comprising:
   a. a laser, a trigger operated automatic fire weapon simulator, and a target display means,
   b. said simulator including means for activating a high intensity visible laser light source, a housing having means for mounting on an unloaded trigger operated automatic fire weapon, and means to direct a visible laser beam along the line of fire of the weapon as aimed,
   c. laser beam modulated means including means to rotate a peripherally slotted disc shutter having a selected number and width of slots and positioned in said housing to modulate the beam of said laser light source to simulate the cyclic firing rate of said weapon, and
   d. a second shutter normally positioned to interrupt the beam of said laser and activation means including a mechanical, trigger-activated switch means for connection to the trigger of the weapon thereby moving said second shutter out of the path of said laser beam when the trigger of the automatic weapon is pressed to permit said laser beam to pass to said modulation means and project an output from said weapon simulator cyclic modulated beam,
   e. said target display means being positioned to receive said modulated laser beam and display thereon a relatively small, blinking area of light as an indicator of the degree of accuracy of operation and direction of the weapon simulator.

2. Apparatus according to claim 1, wherein
   a. said display means includes the display of a moving target for gunner training in detection, recognition and tracking.

3. Apparatus according to claim 1, wherein
   a. said target display means includes a plurality of stationary targets at a fixed range, and
   b. said trainer includes a camera filtered with a narrow bandpass filter whose spectral transmission is centered at the emitting wavelength of said modulated laser beam, the density of said filter being chosen based on the ambient light level and the contemplated firing exercise time such that the camera will record both target image and hits.

4. Apparatus according to claim 1, including
   a. motorized means for rotating said disc shutter at a desired speed,
   b. elecrical actuating means for moving said second shutter out of the path of said laser beam when said means is energized,
   c. a power supply having a switch for energizing said laser light source and said motorized disc shutter to propagate said cyclically modulated laser beam, and
   d. switch means actuated by the trigger of the weapon and connected to said power source and said electrical actuating means for said second shutter to interrupt said modulated laser beam except when the weapon trigger is depressed.

5. Apparatus according to claim 4, wherein said housing includes an apertured cover plate to interrupt any possible deflected laser beams and pass only a direct sighted normal modulated laser beam.

* * * * *